(12) United States Patent
Enescu et al.

(10) Patent No.: US 8,743,992 B2
(45) Date of Patent: Jun. 3, 2014

(54) CODEBOOK DESIGN AND STRUCTURE FOR MULTI-GRANULAR FEEDBACK

(75) Inventors: Mihai Enescu, Espoo (FI); Timo Roman, Espoo (FI); Tommi Koivisto, Espoo (FI); Timo Lunttila, Espoo (FI); Shuang Tan, Beijing (CN); Helka-Liina Määttänen, Helsinki (FI); Kari Pietikäinen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/639,094

(22) PCT Filed: Apr. 6, 2010

(86) PCT No.: PCT/CN2010/071562
§ 371 (c)(1),
(2), (4) Date: Oct. 2, 2012

(87) PCT Pub. No.: WO2011/124012
PCT Pub. Date: Oct. 13, 2011

(65) Prior Publication Data
US 2013/0058424 A1    Mar. 7, 2013

(51) Int. Cl.
*H04L 1/02* (2006.01)
*H04B 7/02* (2006.01)
(52) U.S. Cl.
USPC ........... 375/267; 375/295; 375/299; 370/334; 455/101
(58) Field of Classification Search
USPC ............ 375/267, 295, 299; 370/334; 455/101
See application file for complete search history.

(56) References Cited

U.S. PATENT DOCUMENTS

| 7,817,739 | B2* | 10/2010 | Wennstrom et al. | 375/260 |
| 8,059,733 | B2* | 11/2011 | Khojastepour et al. | 375/260 |
| 8,452,334 | B2* | 5/2013 | Khojastepour | 455/562.1 |
| 2007/0191066 | A1 | 8/2007 | Khojastepour et al. | |
| 2008/0225962 | A1 | 9/2008 | Zhou et al. | |
| 2009/0147880 | A1 | 6/2009 | Wennstrom et al. | |
| 2013/0058424 | A1* | 3/2013 | Enescu et al. | 375/267 |

FOREIGN PATENT DOCUMENTS

| CN | 101330479 A | 12/2008 |
| CN | 101499986 A | 8/2009 |
| CN | 101635612 A | 1/2010 |
| WO | 2011/098670 A1 | 8/2011 |

OTHER PUBLICATIONS

"Codebook for 8Tx DL SU-MIMO for LTE-A ", 3GPP TSG RAN1#60, R1-101462, Agenda: 7.2.4.4, Motorola, Feb. 22-26, 2010, 4 pages.

(Continued)

*Primary Examiner* — Ted Wang
(74) *Attorney, Agent, or Firm* — Nokia Corporation (57) ABSTRACT

A first precoding matrix W1 is selected from a first codebook comprising sets of rank specific precoding matrices. The first codebook is characterized by there being fewer precoding matrices associated with higher ranks than associated with lower ranks, and characterized by precoding matrices associated with ranks above a certain rank all being diagonal matrices. The selected first precoding matrix W1 is used to select a rank-specific second precoding matrix W2 from a second codebook, such that the selected first and second precoding matrices form a joint precoder specific to a desired rank. The second codebook is characterized by differently sized precoding matrices associated with each of N total ranks, in which N is an integer greater than one. Information on the joint precoder is reported to a network node over an uplink transmission channel.

20 Claims, 5 Drawing Sheets

(56) References Cited

OTHER PUBLICATIONS

Ericsson et al., "Way Forward for Rel-10 Feedback Framework", 3GPP TSG RAN1#60, R1-101683, Mar. 2010, 2 pages.
"Downlink 8TX Codebook Considerations", 3GPP TSG RAN WG1#59bis, R1-100256, Agenda: 7.2.4.4, Huawei, Jan. 18-22, 2010, 11 pages.
"A Flexible Feedback Concept", 3GPP TSG-RAN WG1 #59bis, R1-100051, Agenda: 7.2.4.1, Ericsson, ST-Ericsson, Jan. 18-22, 2010, 5 pages.
"PMI-based Multi-Granular Feedback for SU/MU-MIMO Operation", 3GPP TSG-RAN WG1 #60, R1-100852, Agenda: 7.2.4.1, Ericsson, ST-Ericsson, Feb. 22-26, 2010, 5 pages.
"Further Performance Evaluations of Differential Codebooks for Rel. 8 PMI Enhancements", 3GPP TSG RAN WG1 Meeting #60, R1-101164, Agenda: 7.2.4.1.1, Samsung, Feb. 22-26, 2010, pp. 1-6.
"Differential Feedback Scheme Evaluation", 3GPP TSG RAN WG1 meeting #59bis, R1-100759, Agenda: 7.2.4.1, Huawei, Jan. 18-22, 2010, 4 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP TS 36.300, V8.6.0, Sep. 2008, pp. 1-137.
"Codebook Design for 8 Tx Transmission in LTE-A", 3GPP TSG RAN WG1 Meeting #56, R1-091079, Agenda: 12.4, Samsung, Feb. 9-13, 2009, 8 pages.
"Adaptive Codebook Designs for DL MU-MIMO", 3GPP TSG RAN WG1 meeting #57bis, R1-092389, Agenda: 15.6, Huawei, Jun. 29-Jul. 3, 2009, 10 pages.
International Search Report and Written Opinion received for corresponding Patent Cooperation Treaty Application No. PCT/CN2010/071562, dated Jan. 13, 2011, 12 pages.
Extended European Search Report received for corresponding European Patent Application No. 10849249.7, dated Oct. 4, 2013, 7 pages.
"Precoding Considerations in LTE MIMO Downlink", TSG-RAN WG1 #48, R1-071044, Agenda: 6.7.1, Ericsson, Feb. 12-16, 2007, 11 pages.
Office action received for corresponding Taiwan Patent Application No. 100111591, dated Nov. 26, 2013, 4 pages of office action and 2 pages of office action translation.
RU Office Action received for corresponding Patent Application No. 2012125900, dated Feb. 25, 2014, 5 pages.

\* cited by examiner

CODEBOOK DESIGN AND STRUCTURE FOR MULTI-GRANULAR FEEDBACK

RELATED APPLICATION

This application was originally filed as PCT Application No. PCT/CN2010/071562 filed Apr. 6, 2010.

TECHNICAL FIELD

The exemplary and non-limiting embodiments of this invention relate generally to wireless communication systems, methods, devices and computer programs and, more specifically, relate to codebooks and precoder codewords for use in a system with multiple transmit and/or multiple receive antennas per node.

BACKGROUND

Various abbreviations that appear in the specification and/or in the drawing figures are defined as follows:

| | |
|---|---|
| 3GPP | third generation partnership project |
| CB | codebook |
| CoMP | coordinated multi-point transmission/reception |
| CQI | channel quality indicator |
| CRC | cyclic redundancy check |
| CSI | channel state information (for example, CQI, PMI, and RI) |
| CSI-RS | channel state information reference symbols |
| CW | codeword |
| DL | downlink |
| eNB | base station of an EUTRAN/LTE system |
| EUTRAN | evolved UTRAN (also referred to as LTE or 3.9 G) |
| LTE | long term evolution |
| ITU | international telecommunication union |
| ITU-R | ITU radiocommunication sector |
| MCS | modulation and coding scheme |
| MIMO | multiple-input-multiple-output |
| MU-MIMO | multi-user multiple input multiple output |
| Nr | number of receive antennas |
| Nt | number of transmit antennas |
| OFDMA | orthogonal frequency division multiple access |
| PDCCH | physical downlink control channel |
| PRB | physical resource block |
| PMI | precoding matrix indicator |
| PUCCH | physical uplink control channel |
| PUSCH | physical uplink shared channel |
| RI | rank indicator |
| RS | reference symbols |
| SU-MIMO | single-user multiple-input-multiple-output |
| TBS | transport block size |
| TX | transmit |
| UE | user equipment |
| UL | uplink |
| UTRA | universal mobile telecommunication system terrestrial radio access |
| UTRAN | UTRA network |
| XP | cross polarized/polarization |

In the communication system known as evolved UTRAN (E-UTRAN, also referred to as UTRAN-LTE, E-UTRA or 3.9G), the LTE Rel. 8 is completed, the LTE Rel. 9 is being standardized, and the LTE Rel. 10 is currently under development within the 3GPP. In the downlink (DL), LTE Rel. 10 will support 8-Tx DL SU-MIMO with up to eight spatial layers (streams) as well as enhanced DL MU-MIMO transmission.

Figure 1:
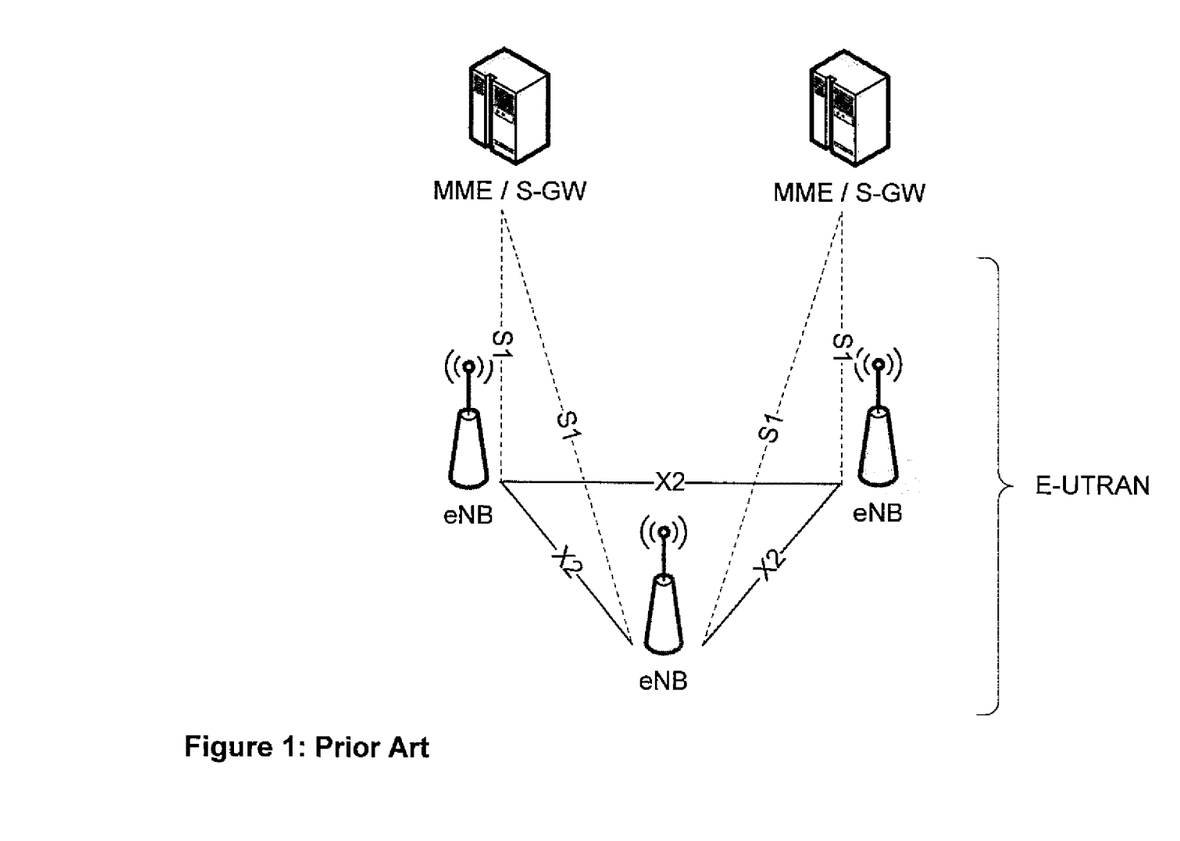
FIG. 1 reproduces FIG. 4 of 3GPP TS 36.300, and shows the overall architecture of the E-UTRAN system.

FIG. 1 reproduces FIG. 4.1 of 3GPP TS 36.300, V8.6.0 (2008-09), and shows the overall architecture of the E-UTRAN system. The EUTRAN system comprises eNBs, providing the EUTRA user plane and control plane (RRC) protocol terminations towards the UE. The eNBs are interconnected with each other by means of an X2 interface. The eNBs are also connected by means of an S1 interface to an EPC, more specifically to a Mobility Management Entity and to a Serving Gateway. The S1 interface supports a many to many relationship between Mobility Management entities/Serving Gateways and eNBs.

Of particular interest herein are the further releases of 3GPP LTE targeted towards future IMT-A systems, referred to herein for convenience simply as LTE-Advanced (LTE-A). LTE-A is directed toward extending and optimizing the 3GPP LTE Release 8 radio access technologies to provide higher data rates at very low cost. LTE-A will most likely be part of LTE Release 10. LTE-A is expected to use a mix of local area and wide area optimization techniques to fulfill the ITU-R requirements for IMT-Advanced while keeping the backward compatibility with LTE Release 8. In order to meet the peak spectral efficiency requirements (up to 30 bit/s/Hz) support of up to 8 TX antennas in DL will be standardized in LTE Release 10, enabling DL spatial multiplexing transmission with up to 8 spatial layers. Both 8-TX DL MIMO and enhanced MU-MIMO are now agreed to be in the Release 10 for enhanced DL MIMO transmission.

What is needed in LTE Release 10 is a codebook design for 8 transmit (TX) antennas. In RAN1#59 it has been agreed to extend the Release 8 implicit feedback framework to LTE Release 10. This is based on a modular design (or multi-granular), combining two feedback components from distinct codebooks: one feedback component which represents the long-term (for example, wideband) channel properties while the other feedback component targets short term (for example, frequency selective) channel properties.

Comparing to LTE Release 8/9, two new flavours of DL MIMO are considered for LTE Release 10:

The optimization of MU-MIMO operation, which benefits from a new reference symbol design package in terms of precoded UE specific reference symbols (sometimes referred to as UE-RS or demodulation reference symbols DRS or DM-RS) and periodic channel state information reference symbols (CSI-RS).

Extension to up to 8-layer DL MIMO operation (i.e. spatial multiplexing with up to eight spatial streams).

These enhancements will be supported by a new UE feedback mode for channel state information (CSI) and channel quality indication (CQI), following the implicit feedback principles in LTE Release 8. Accurate CSI feedback is important, especially for MU-MIMO. Moreover, signalling aspects and codebook sizes take on a greater importance when considering the extension to 8-layer SU-MIMO operation.

Codebook (CB) entries in LTE Release 8 have been defined for up to rank 4 transmission and follow several design constraints like constant modulus, finite alphabet and nested property. Operating such CBs is rather straightforward: based on the estimated channel over common reference symbols (CRS), the UE determines its preferred transmission rank for this channel and based on this selects the codewords based on a selection criteria like for example throughput maximization. For brevity term these codebook definitions and operations as traditional CB or single codebook operation.

There have been several contributions in LTE Release 10 for codebooks based on the traditional CB design. For example, document R1-101462 by Motorola proposes several CBs of 4-5 bits size, with codewords allowing operation in both Uniform Linear Arrays (ULA) scenarios and also in cross-polarized (XP) scenarios. Other proposals for traditional CB designs were submitted in RAN1#60.

During RAN1#60, it has been agreed to extend the Release 8 feedback mode consisting of implicit signalling of PMI/RI/

CQI (see for example document R1-101683). The agreed modular (multi-granular) structure of the CB consist of two precoding matrices, one targeting the wideband and/or long term channel properties the other targeting the frequency-selective and/or short term channel properties. Proposals in this regard have been made in RAN #59, for example by Huawei (document R1-10025 entitled: Downlink 8Tx codebook considerations) and by Ericsson (document R1-100051, entitled: A flexible feedback concept).

These teachings are directed toward multi-granular structured CBs, and explore certain considerations for designing such multi-granular CBs for best use in systems supporting high and/or multiple transmission ranks for SW and MU-MIMO such as LTE Release 10.

SUMMARY

In a first aspect thereof the exemplary embodiments of the invention provide a method comprising: selecting a first precoding matrix W1 from a first codebook comprising sets of rank specific precoding matrices, the first codebook characterized by there being fewer precoding matrices associated with higher ranks than associated with lower ranks, and characterized by preceding matrices associated with ranks above a certain rank all being diagonal matrices; using the selected first precoding matrix W1 to select a rank-specific second preceding matrix W2 from a second codebook such that the selected first and second precoding matrices form a joint precoder specific to a desired rank, in which the second codebook is characterized by differently sized precoding matrices associated with each of N total ranks, in which N is an integer greater than one; and reporting information on the joint precoder to a network node over an uplink transmission channel.

In a second aspect thereof the exemplary embodiments of the invention provide an apparatus comprising at least one processor and at least one memory storing computer program code. The at least one memory storing the computer program code is configured with the at least one processor to cause the apparatus at least to perform: selecting a first precoding matrix W1 from a first codebook comprising sets of rank specific precoding matrices, the first codebook characterized by there being fewer precoding matrices associated with higher ranks than associated with lower ranks, and characterized by precoding matrices associated with ranks above a certain rank all being diagonal matrices; using the selected first precoding matrix W1 to select a rank-specific second preceding matrix W2 from a second codebook such that the selected first and second precoding matrices form a joint precoder specific to a desired rank, in which the second codebook is characterized by differently sized precoding matrices associated with each of N total ranks, in which N is an integer greater than one; and reporting information on the joint precoder to a network node over an uplink transmission channel.

In a third aspect thereof the exemplary embodiments of the invention provide a computer program comprising: code for selecting a first precoding matrix W1 from a first codebook comprising sets of rank specific precoding matrices, the first codebook characterized by there being fewer preceding matrices associated with higher ranks than associated with lower ranks, and characterized by precoding matrices associated with ranks above a certain rank all being diagonal matrices; code for using the selected first precoding matrix W1 to select a rank-specific second precoding matrix W2 from a second codebook such that the selected first and second precoding matrices form a joint precoder specific to a desired rank, in which the second codebook is characterized by differently sized precoding matrices associated with each of N total ranks, in which N is an integer greater than one; and code for reporting information on the joint precoder to a network node over an uplink transmission channel. In a particular embodiment the computer program according to the above third aspect is a computer program product comprising a computer readable medium or memory bearing computer program code embodied therein for use with a computer.

In a fourth aspect thereof the exemplary embodiments of the invention provide a method comprising: receiving from a user equipment an indication of a joint precoder; determining from the received indication a first precoding matrix W1 by accessing a first codebook stored in a computer readable memory, the first codebook comprising sets of rank specific precoding matrices and characterized by there being fewer precoding matrices associated with higher ranks than associated with lower ranks, and characterized by precoding matrices associated with ranks above a certain rank all being diagonal matrices; determining from the received indication a second precoding matrix W2 by accessing a second codebook stored in the computer readable memory, the second codebook characterized by differently sized precoding matrices associated with each of N total ranks, in which N is an integer greater than one;

and using at least the determined first and second preceding matrices to spatially encode a transmission to at least the user equipment.

In a fifth aspect thereof the exemplary embodiments of the invention provide an apparatus comprising at least one processor and at least one memory storing computer program code. The at least one memory storing the computer program code is configured with the at least one processor to cause the apparatus at least to perform: determining, from a received indication of a joint precoder, a first precoding matrix W1 by accessing a first codebook stored in the memory, the first codebook comprising sets of rank specific precoding matrices and characterized by there being fewer preceding matrices associated with higher ranks than associated with lower ranks, and characterized by precoding matrices associated with ranks above a certain rank all being diagonal matrices; determining from the received indication a second precoding matrix W2 by accessing a second codebook stored in the memory, the second codebook characterized by differently sized preceding matrices associated with each of N total ranks, in which N is an integer greater than one; and using at least the determined first and second precoding matrices to spatially encode a transmission to at least the user equipment In a sixth aspect thereof the exemplary embodiments of the invention provide a computer program comprising: code for determining, from a received indication of a joint precoder, a first precoding matrix W1 by accessing a first codebook stored in the memory, the first codebook comprising sets of rank specific precoding matrices and characterized by there being fewer preceding matrices associated with higher ranks than associated with lower ranks, and characterized by precoding matrices associated with ranks above a certain rank all being diagonal matrices; code for determining from the received indication a second precoding matrix W2 by accessing a second codebook stored in the memory, the second codebook characterized by differently sized precoding matrices associated with each of N total ranks, in which N is an integer greater than one; and code for using at least the determined first and second precoding matrices to spatially encode a transmission to at least the user equipment.

These and other aspects are detailed below with particularity.

BRIEF DESCRIPTION OF THE DRAWINGS

The foregoing and other aspects of the exemplary embodiments of this invention are made more evident in the following Detailed Description, when read in conjunction with the attached Drawing Figures.

DETAILED DESCRIPTION

Below are detailed exemplary embodiments of codebook design and structure for multi-granular channel state information (CSI) feedback in support of DL SU-/MU-MIMO operation. The examples and description are in the context of LTE Release 10, but these teachings are not limited only to that wireless system and may be adapted to other SU-MIMO and/or MU-MIMO systems. The examples below describe codebooks for up to 8 TX antennas, but these teachings may be readily applied for wireless systems which use a maximum of 4 TX antennas as well as more than 8 TX antennas. The examples set forth below also proceed from the reuse of Release 8 codebooks (CB) to the definition of new CBs for either long and/or short term feedback components. The multi-granular codebook structure according to these teachings ensures efficient DL single- (SU) and multi-user (MU) MIMO operation, for example in LTE Release 10.

The agreed modular (multi-granular) structure of the CB consists of two precoding matrices, one targeting the wideband and/or long term channel properties that is denoted as W1, the other targeting the frequency-selective and/or short term channel properties that is denoted as W2. The resulting precoder W for each subband may be for example the product of these two matrices. One also achieves efficient feedback compression and hence lower associated UL overhead as the long term CSI is not expected to change as often as its short term counterpart.

The advantage gained by such adaptive and modular feedback stems essentially from the MU-MIMO perspective: it is widely acknowledged that most MU-MIMO gains over SU-MIMO are achieved in scenarios with closely spaced TX antennas and small azimuth (angular) spread at the eNB which is precisely the scenario in which there exists long term wideband correlation in the wireless channel. Multi-user separation/multiplexing is then performed efficiently based on long term CSI (direction of arrival DoA is one example of such a long term channel property) while UE-specific rank adaptation happens mostly based on short term CSI (in case rank is greater than 1 per UE in the MU-MIMO mode is both feasible & supported). With practical eNB antenna deployments comprising cross-polarized antenna arrays, this translates to MU-MIMO (wideband) beamforming (for example, UE separation) in the beam domain via groups of co-polarized antenna elements while UE-specific rank adaptation happens within each (UE-specific) beam that is transmitted by combining the two polarizations adequately. It therefore makes sense to optimize UE feedback towards this direction. Alternatively, such an approach does not preclude either achieving gains from SU-/MU-MIMO in an uncorrelated scenario, in which case the long term (wideband) CSI is expected to be of less importance while the short term CSI will play an increased role.

In case of uncalibrated antenna deployments, the long term component W1 may be used also for restoring the antenna calibration. This may be done by defining the codebook W1 with finer granularity and allowing wideband or per subband operation in conjunction with further selecting the W2 codebook in order to construct a final precoding matrix W. Alternatively, W1 may be a diagonal matrix consisting of phase offsets as diagonal elements which serve the purpose of restoring calibration of the transmit antennas array. In such case the W2 codebook consists of precoding matrices of size [8×rank] in the case of 8-TX and further leads to the construction of the multi-granular precoding matrix W.

For codebook design this means that the long term channel statistics should be supported by wideband feedback with sufficiently high granularity (for example, 4-5 bits) and optimized for typical antenna configuration (for example, ULA or cross-polarized arrays). Larger codebook sizes may be used as well, for example in the range of 8 bits. One may also allow the long term feedback to be computed per subband while also the long term codebook may be scenario specific. While codebooks for the short term feedback component, re-using 2- and 4-Tx codebooks from LTE Release 8 is an appealing baseline for the feedback of short term CSI from the perspective of the UE implementation and of the written Release 10 specification. These 2- and 4- Tx codebooks may be further enhanced to contain antenna selection vectors which enable virtual beam selection. In the cases when reusing LTE Release 8 codebooks is not possible, specific codebooks are defined, for example codebooks comprising of precoding matrices of size [8×rank] are to be used for the cases when 8 TX dimensionality is applicable for W2.

In 3GPP the dual codebook design aspects and operation principles are currently open for discussion. Exemplary embodiments of the invention provide novel multi-granular codebook design principles in support of multi-granular CSI feedback, and the examples below give specific design choices for both the long term and the short term feedback component which result in good performance as well as efficient feedback in practical scenarios.

First are listed some specific guidelines for designing the two codebooks. The two matrices W1 and W2 may play various roles in the multi-granular mechanism, highlighted below. The codebook W, used for the actual transmission, is constructed from (for example the product of) the double codebooks W1 and W2.

W1 targets the long term feedback as well as wideband feedback and also subspace compression, thus there are three separate issues.

The maximum transmission rank of matrix W1 is the lesser of Nt and Nr. For example, in LTE Release 10 the maximum rank may be 8.

When constructing W1, the number of codewords per transmission rank may be different between ranks.

For high ranks of W1, there may be fewer elements per rank compared with the low rank definitions of W1.

As a special case, the rank specific elements in the codebook W1 for higher ranks may consist of only one element each, the identity matrix of size Nt*Nt.

The codebook W1 may consist of only diagonal elements representing phase corrections, such as for example corrections that might be useful for antenna calibration. These diagonal elements are for instance unity-modulus complex values selected from a finite alphabet and the first diagonal element may be selected as 1, since the overall phase of the final codeword is irrelevant.

Codebook W1 may be constructed wideband or per subband. The size of the sub-band is a multiple of PRBs/ frequency chunks. Time averaging may be added in the construction of W1.

W1 may be a hierarchical/adaptive codebook which leads to codebook adaptation/tracking over time.

The codebook W2 may contain LTE Release 8 codewords. It may be enhanced with antenna selection vectors, for example to perform virtual beam selection.

For higher ranks of W2 there may be fewer elements per rank compared with the low rank definitions of W2.

The codebooks W1 and W2 may be used both for antenna virtualization and antenna selection.

These design principles and reasons therefore are detailed further in the three examples below. Each of those three examples are for a codebook structure/combination for multi-granular CSI reporting based on a dual codebook. In those examples, subscripts indicate precoding matrix dimensions; I indicates the identity matrix; R8 refers to LTE Release 8 codebooks, RI refers to rank indicator, PMI1 refers to a wideband report from codebook W1, and PMI2 refers to a wideband or a frequency selective report from a LTE Release 8 codebook or from codebook W2.

The inventors consider for the first example below, in table 1, that dual codebook reporting generally makes most sense in terms of feedback compression/accuracy for lower transmission ranks where there precisely exists a spatial subspace structure in the wireless transmission channel. For higher transmission ranks, rich scattering is typically observed which tends to decorrelate the channel spatially and thereby reduce the gains of the wideband precoding. For this reason fewer elements per transmission rank in the codebook W1 for these high ranks are sufficient. Even a single matrix, the identity matrix, as precoder for W1 is expected to provide adequate performance in such cases.

The second and third examples at tables 2 and 3 provide non-limiting examples of other possible dual-codebook structure across the 8 transmission ranks. For brevity the description below refers to the case of 8 TX antennas, but the rank may arise from the number of receive antennas as well, and as noted above these teachings may readily apply also to maximum ranks other than the maximum rank of 8 taken from LTE Release 10.

With no loss of generality, in the following example we refer to 8 Tx antennas. Techniques herein are applicable for other number of antennas as well, for example 4 TX or larger than 8 TX.

TABLE 1

First example codebook structure

| RI | PMI1 | PMI2 |
|---|---|---|
| 1 | $W1_{8\times2}$ for RI = 1, 2 | $W2_{2\times1}$ (e.g. rank-1 Rel-8 2 Tx codebook, possibly with the addition of antenna selection vectors) |
| 2 | | $W2_{2\times2}$ (e.g. rank-2 Rel-8 2 Tx codebook, possibly with the addition of the identity matrix $I_{2\times2}$) |
| 3 | $W1_{8\times8}$ for RI = 3 to 8 (e.g $I_{8\times8}$ or diagonal matrix containing phase corrections for calibration purpose) | $W2_{8\times3}$ (i.e. 8 Tx rank-3 codebook) |
| 4 | | $W2_{8\times4}$ (i.e. 8 Tx rank-4 codebook) |
| 5 | | $W2_{8\times5}$ (i.e. 8 Tx rank-5 codebook) |
| 6 | | $W2_{8\times6}$ (i.e. 8 Tx rank-6 codebook) |
| 7 | | $W2_{8\times7}$ (i.e. 8 Tx rank-7 codebook) |
| 8 | | $W2_{8\times8}$ (i.e. 8 Tx rank-8 codebook) |

For this first example, a rich scattering environment is typically observed for the high transmission ranks 3 through 8. The resulting channel decorrelation largely reduces the potential gains from wideband precoding, and so a more complex codebook than the identity matrix for W1 offers little additional advantage. However, there might be cases, for example in uncalibrated antenna scenarios, when a diagonal matrix containing phase corrections for calibration purpose would be more effective.

TABLE 2

Second example codebook structure

| RI | PMI1 | PMI2 |
|---|---|---|
| 1 | $W1_{8\times2}$ for RI = 1, 2 | $W2_{2\times1}$ (e.g. rank-1 Rel-8 2 Tx codebook, possibly with the addition of antenna selection vectors) |
| 2 | | $W2_{2\times2}$ (e.g. rank-2 Rel-8 2 Tx codebook) |
| 3 | $W1_{8\times4}$ for RI = 3, 4 | $W2_{4\times3}$ (e.g. rank-3 Rel-8 4 Tx codebook, possibly with the addition of antenna selection vectors) |
| 4 | | $W2_{4\times4}$ (e.g. rank-4 Rel-8 4 Tx codebook, possibly with the addition of the identity matrix $I_{4\times4}$) |
| 5 | $W1_{8\times8}$ for RI = 5 to 8 (e.g $I_{8\times8}$ or diagonal matrix containing phase corrections for calibration purpose) | $W2_{8\times5}$ (i.e. 8 Tx rank-5 codebook) |
| 6 | | $W2_{8\times6}$ (i.e. 8 Tx rank-6 codebook) |
| 7 | | $W2_{8\times7}$ (i.e. 8 Tx rank-7 codebook) |
| 8 | | $W2_{8\times8}$ (i.e. 8 Tx rank-8 codebook) |

For this second example as well as the third example below, the channel de-correlation (e.g. due to a rich scattering environment) is typically observed for the transmission ranks 5 through 8, as opposed to ranks 3 through 8 in the first example. Use of the identity matrix for W1 in those upper 4 ranks offers similar advantage to that detailed above with regard to the first example and the upper 6 ranks, with similar exception of a diagonal matrix with calibrating phase corrections for the case of uncalibrated antennas.

TABLE 3

Third example codebook structure

| RI | PMI1 | PMI2 |
|---|---|---|
| 1 | $W1_{8\times4}$ for RI = 1, 2, 3, 4 | $W2_{4\times1}$ (e.g. rank-1 Rel-8 4 Tx codebook, possibly with the addition of antenna selection vectors) |
| 2 | | $W2_{4\times2}$ (e.g. rank-2 Rel-8 4 Tx codebook, possibly with the addition of antenna selection vectors) |

TABLE 3-continued

Third example codebook structure

| RI | PMI1 | PMI2 |
|---|---|---|
| 3 | | $W2_{4\times3}$ (e.g. rank-3 Rel-8 4 Tx codebook, possibly with the addition of antenna selection vectors) |
| 4 | | $W2_{4\times4}$ (e.g. rank-4 Rel-8 4 Tx codebook, possibly with the addition of the identity matrix $I_{4\times4}$) |
| 5 | $W1_{8\times8}$ for RI = 5 to 8 (e.g $I_{8\times8}$ or diagonal matrix containing phase corrections for calibration purpose) | $W2_{8\times5}$ (i.e. 8 Tx rank-5 codebook) |
| 6 | | $W2_{8\times6}$ (i.e. 8 Tx rank-6 codebook) |
| 7 | | $W2_{8\times7}$ (i.e. 8 Tx rank-7 codebook) |
| 8 | | $W2_{8\times8}$ (i.e. 8 Tx rank-8 codebook) |

Not shown in the above tables but present in the W1 codebooks they describe is that the W1 codebook comprises sets of rank specific precoding matrices for each rank. For the W1 codebook there are fewer precoding matrices associated with higher ranks (for example, RI=3 through 8) than associated with lower ranks (for example, RI1 and 2). By example and not by way of limitation, there may be 6 or 10 or 20 matrices associated with each of RI=1 and 2, and only 2, 3, 4 or even only 1 precoding matrix associated with each of the higher ranks. At the second example shown at table 2, there may be many or few matrices associated with each of RI=3 and 4, depending upon the specific implementation. The specific matrix of the W1 codebook that the UE selects from within a particular rank depends in part on the channel quality it measures or estimates.

Note also that for the W1 codebook the precoding matrices associated with ranks above a certain rank are all diagonal matrices. In the examples at tables 2 and 3 above the certain rank is RI=4, and so RI=5 through 8 have only diagonal matrices associated with those ranks. In each of these examples, the certain rank RI=4 divides the W1 codebook in half: half of the ranks are higher than RI=4 and half are equal to or lower than RI=4 for these 8-rank examples. While this holds true in these three examples it is not a necessary limitation for all implementations of these teachings. In the example at table 1 above the certain rank is RI=2, and so RI=3 through 8 have only diagonal matrices associated with those ranks. In each of these examples, the certain rank RI=2 divides the codebook such that there are a greater number of ranks above the certain rank as are below and including the certain rank.

Following are five design principles for design of the W1 codebook. Various embodiments of the invention may use one or more of these.

First W1 design principle: NON-DIAGONAL CODEBOOK ENTRIES IS A POTENTIAL SOLUTION WHEN ALL OR SOME OF THE TX ANTENNAS ARE HIGHLY SPATIALLY CORRELATED. WHEN VIRTUALIZING MULTIPLE ANTENNA ELEMENTS INTO A LOWER NUMBER OF ANTENNA PORTS BY WIDE-BAND/LONG TERM REPORTING, ALL THESE PHYSICAL ANTENNAS NEED TO BE HIGHLY CORRELATED.

Wideband/long term reporting of W1 is not reasonable if the channel is not correlated enough, thus the statistics reported by W1 should be stable enough in time and frequency. According to the examples in the three tables above, it is seen that non-identity matrix W1 only needs to be designed for low rank scenarios, for example less than rank 3 for the first example or less than rank 5 for the second and third examples. In such a case, the application of W1 is equivalent to compressing the 8 physical TX antennas channel into 2 or 4 channel beams for further precoding/orthogonalization achieved by W2. Clearly, the more potential channel capacity that is maintained after the antenna virtualization, the better is W1. The channel capacity of MIMO system depends on the number of transmitting/receiving antennas. Therefore, the antenna virtualization performed by W1 will reduce the number of effective antenna ports, and decrease the channel capacity more or less. However, this degradation could be limited by adapting this codebook design principle.

Second W1 design principle: REUSING OF LTE RELEASE 8 4×1 CB FOR 8-BY-2 W1 QUANTIZATION IS A POTENTIAL SOLUTION. FOR XP ANTENNA CONFIGURATION, REPORTING SEPARATE CODEWORDS FOR THE TWO POLARIZATIONS MAY BE CONSIDERED, ESPECIALLY FOR NON-CALIBRATED ENB ANTENNAS.

In scenarios with closely spaced XP antennas and small azimuth spread, the co-polarized antenna elements are highly correlated, but inter-polarized antennas are spatially independent, i.e. uncorrelated. One exemplary embodiment of the 8-by-2 codebook is virtualization of the 4 antenna elements of one polarization into one antenna port, and virtualization of the other 4 elements into another port. It implies that each codebook entry has only 4 non-zero elements in each one of its columns. Then for this specific example, the two columns may be considered separately, and therefore 4-by-1 codebook could be enough. It inspires the reusing of the LTE Release 8 4×1 CB for 8-by-2 W*1 quantization. In document R1-100852 cited in the background section above, there is described the Kronecker model, HW2kronW1=[H'W1 H'W1]/W2, which means same codeword is used for both polarizations. Document R1-101462 also introduces a similar codebook design for the XP scenario. The concern is to have separate CWs for the two polarizations, which are likely different for non-calibrated eNB antennas. Document R1-100256 describes having the same codeword for both polarizations multiplied with a co-phasing term, the difference over document R1-101462 being that R1-101462 has a single phase (−1), and elements also in places where R1-100256 has zeros.

Third W1 design principle: LTE RELEASE 8 2×1 CB COULD BE REUSED FOR 8-BY-4 W1 QUANTIZATION. When 8-by-4 W1 feedback is considered, it indicates that the 8 antennas could be divided into four groups, and intra-group antennas are highly correlated. By example, assuming that each group has two antenna elements, then in a similar way as the previous example, the LTE Release 8 2×1 CB could be reused for 8-by-4 W1 quantization.

Fourth W1 design principle: CODEBOOK W1 MAY BE USED FOR CALIBRATION PURPOSE, ESPECIALLY IN THE CASES WHEN W1 IS MARKED AS DIAGONAL MATRIX IN TABLES 1-3. CODEWORDS OF A CALIBRATION CODEBOOK HAS MULTIPLE DIAGONAL MATRICES, WHOSE DIAGONAL ELEMENTS ARE UNITY-MODULUS COMPLEX VALUES FOR INSTANCE SELECTED FROM A FINITE ALPHABET.

For transmission of a rank greater than 2 (or 4) in the above example tables, the codebook of W1 has fewer elements than for ranks below 2 (respectively 4) and may as a special case consist of a single codeword, which is an 8×8 identity matrix. However, the eNB may employ an un-calibrated antenna array, and the different phase offsets of the antenna elements are believed to be frequency-flat and slowly time-variant. Then the codebook W1 may be used for calibration purpose, and its precoding matrices consist of multiple diagonal matrices whose diagonal elements are unity-modulus complex values selected for instance from a finite alphabet. By employing such a W1-aided antenna calibration method, the design of W2 codebook could focus on the calibrated scenarios, leading to a smaller codebook size.

Fifth W1 design principle: ANOTHER OPTION FOR W1 ADAPTATION IS TO PERFORM CODEWORD (CW) COMBINING IN A SPIRIT OF HIERARCHICAL DESIGN OF CW REFINEMENT.

The natural division of long-term/short-term or wide-band/narrow-band feedback is not necessarily the same as the division with dimensioning. The W1 part usually gives most of the CSI in size. As for the W2 part, a refinement for W1+W2 could be fed back. The W1 long term and W1 short term components are combined and multiplied with W2. W1 is hierarchical, and W2 may be hierarchically combined with the long-term W1. In this case the matrix dimensions might match along the N measure if for example W1 were a N*M matrix and W2 were a N*R matrix (R being the transmission rank).

Following are two design principles for design of the W2 codebook. Various embodiments of the invention may use one or more of these.

First W2 design principle: THE CODEBOOK DESIGN OF SHORT-TERM FEEDBACK W2 SHOULD MAINLY CONSIDER LOW ANTENNA CORRELATION SCENARIOS. Since W1 has handled antenna correlation and/or calibration, the virtualized antenna ports seen by W2 may be assumed to exhibit low spatial correlation.

Second W2 design principle: ANTENNA SELECTIVE CODEWORDS SHOULD BE CONSIDERED FOR W2 CODEBOOK DESIGN. Under the above assumption, for full rank transmission of W2 (for example, rank 2 for 8×2 W1 or rank 4 for 8×4 W1), the identity matrix might be a good candidate for codeword selection. For the cases when the number of uncorrelated antenna groups is less than the number of W1 columns, antenna-selective codewords should be considered for W2 codebook design. For example, in scenarios of closely spaced ULA antennas and small azimuth spread, all except one of the virtualized antenna ports have an effective deep-fading channel. Antenna-selective codewords should be selected for W2 in order to avoid wasting of transmit power. For instance, reusing LTE Rel. 8 2 TX (and respective 4 TX) codebooks for W1 of size 8×2 (resp. 8×4) with the addition of antenna selective vectors for ranks lower than 2 (resp. 4) and the identity matrix for rank equal to 2 (resp. 4) could offer a good starting point for W2 design and benchmark.

There is an additional principle to consider in the design of the joint W1 and W2 codebook, or in other words the resulting multi-granular precoder. For instance when the latter takes a product form, when the constant modulus property is required for the product of W1 and W2, a separate design of constant-modulus satisfied W1 and W2 codebooks may not guarantee this constraint on the joint resulting codebook; some further restrictions may be needed.

Assume by example that the $i^{th}$ row of W1 is $[c(\alpha_{i1}\alpha_{i2}\ldots\alpha_{iK}]$ and the $j^{th}$ column of W2 is $[\beta_{1j}\beta_{2j}\ldots\beta_{Kj}]^T$. Then the (i,j) element of the product of W1 and W2 may be expressed as $\Sigma_k(\alpha_{ik}\cdot\beta_{kj})$. Since the phases of $\alpha_{ik}$ and $\beta_{kj}$ could be arbitrary to some extent, the sum's amplitude may have several possible values. One solution to solve this constant modulus problem is to define that the set $\{\alpha_{ik}\cdot\beta_{kj}, \text{where } k=1,2,\ldots,K\}$ has only one non-zero element at most. For example, the solution reusing the LTE Release 8 4×1 CB satisfies this rule.

Figure 2A:
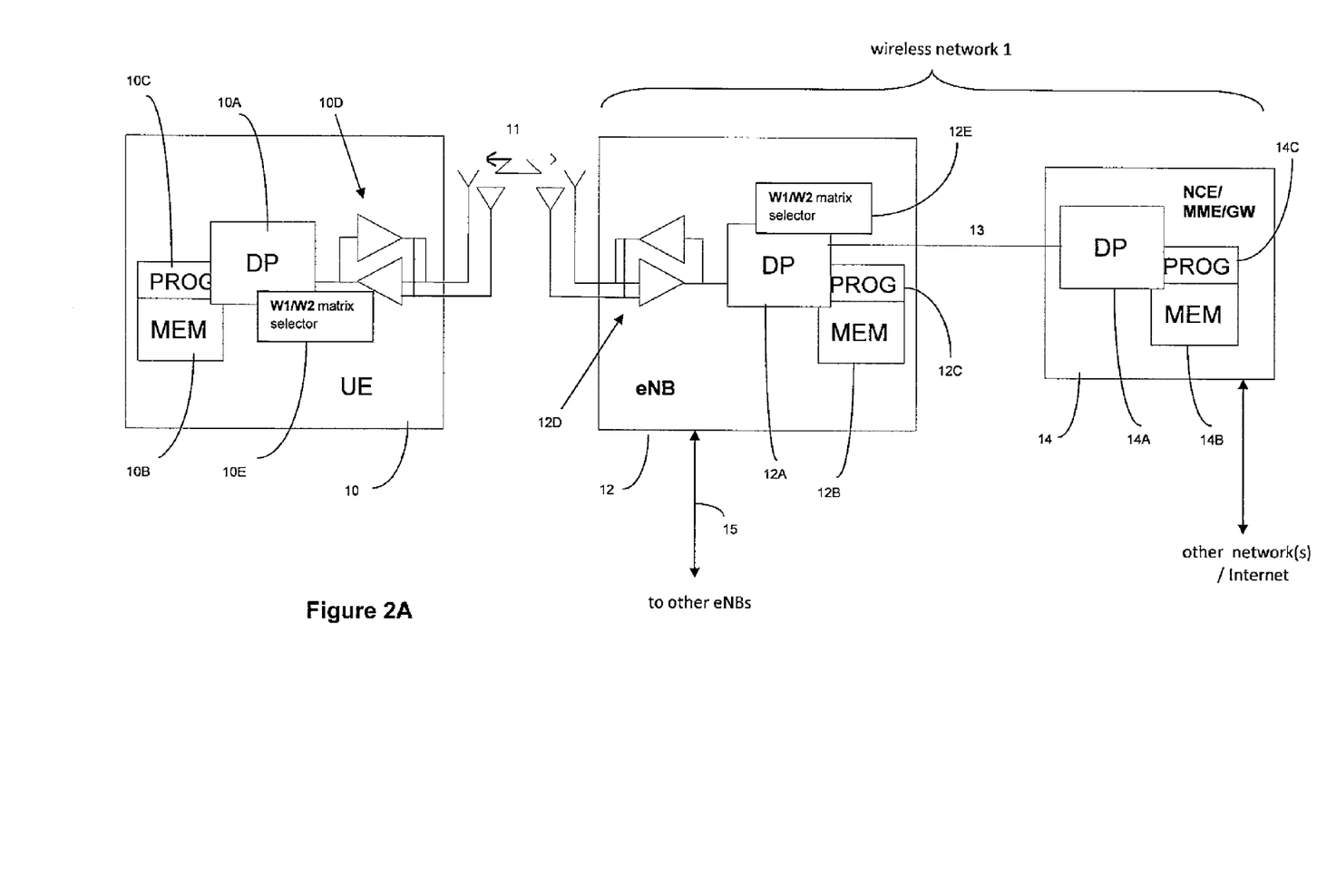
FIG. 2A shows a simplified block diagram of various electronic devices that are suitable for use in practicing the exemplary embodiments of this invention.
Figure 2B:
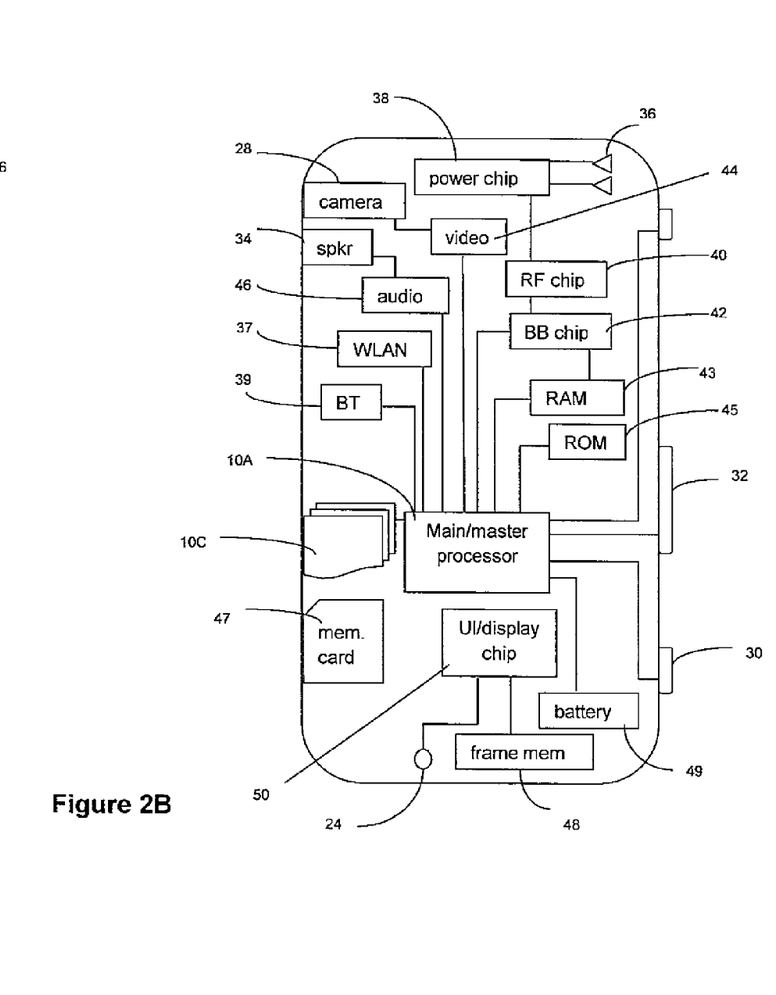
FIG. 2B shows a more particularized block diagram of a user equipment such as that shown at FIG. 2A.

Reference is now made to FIG. 2A for illustrating a simplified block diagram of various electronic devices that are suitable for use in practicing the exemplary embodiments of this invention. In FIG. 2A a wireless network 1 is adapted for communication with an apparatus, such as a mobile communication device referred to as a UE 10, via a network access node, such as a Node B (base station), and more specifically an eNB 12. The network 1 may comprise a network control element (NCE) 14 that may comprise the MME/S-GW functionality shown in FIG. 1, and which provides connectivity with another network, such as a telephone network and/or a data communications network (e.g., the internet). The UE 10 comprises a data processor (DP) 10A, a memory (MEM) 10B that stores a program (PROG) 10C, and a suitable radio frequency (RF) transceiver 10D for bidirectional wireless communications with the eNB 12, which also comprises a DP 12A, a MEM 12B that stores a PROG 12C, and a suitable RF transceiver 12D. Those communications are over channels 11, such as for example the PUCCH and the PUSCH. The UE 10 sends its precoded transmissions via two or more antennas, although it may use one or more of the antennas for reception without departing from these teachings. It is also possible that the uplink SU-MIMO capable terminal operates in a single-antenna-port mode where the UE appears as non-MIMO terminal from the eNB point of view. The eNB 12 has at least one transmit antenna but typically an array of multiple antennas to support its own MU-MIMO transmission and reception to the multiple UEs of which one or more may at any instant be engaging in SU-MIMO transmissions using precoding according to these teachings. The eNB 12 is coupled via a modem (not shown) and a data path 13 to a modem (not shown) of the NCE 14. That data path 13 may be implemented as an S1 interface as shown at FIG. 1. An instance of an X2 interface 15 may be present for coupling to another eNB as FIG. 2A indicates.

At least one of the PROGs 10C and 12C is assumed to comprise program instructions that, when executed by the associated DP, enable the device to operate in accordance with the exemplary embodiments of this invention. That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also comprise a matrix selector 10E, and the eNB 12 may comprise a matrix selector 12E. For the DL described in the specific exemplary embodiments, particularly the eNB's selector 12E operates to select the proper W1 and W2 matrices from a joint precoder that is reported by the UE 10. The UE 10 also selects matrices W1 and W2 from the two codebooks and multiplies the selected matrices together (or otherwise logically combines them) to generate a joint precoding matrix W1*W2. The eNB 12 takes frequency specific elements from the codebooks and uses them to precode a transmission to the UE on a specific sub-band in that frequency (for example, a SU-MIMO transmission or a MU-MIMO transmission). The UE 10 may also decode the transmission it receives from the eNB 12 using the joint precoder it reported. In an embodiment the matrix selectors 10E, 12E are implemented in software; in another embodiment they are implemented in hardware (DP and/or other circuitry); and in a still further embodiment they are implemented in a combination of software and hardware and/or firmware. The matrix selector 12E selects, for a desired transmission rank, the appropriate W1 and W2 matrices from respective first and second sets of precoding matrices stored in the local MEM, such as the sets shown at the examples of tables 1 through 3 above. Note that selecting RI=x for both codebooks does not always result in a joint precoder of rank x; multiplying the selected matrices together may yield a different rank for the joint precoder, as known in the art.

Note also that the UE may report the joint precoder in different ways. In one embodiment the information on the joint precoder that is reported to the network node comprises separate indications of the selected first preceding matrix W1 and the selected second preceding matrix W2. The eNB may then multiply or otherwise combine them to form the joint precoder that it uses for its downlink transmission. In another embodiment the information on the joint precoder that the UE 10 reports to the network node comprises an indication of a logical combination of the selected first precoding matrix W1 combined with the selected second precoding matrix W2.

In general, the various embodiments of the UE 10 may comprise, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may comprise one or more of general purpose computers, special purpose computers, microprocessors, digital signal processors (DSPs) and processors based on a multicore processor architecture, as non-limiting examples.

Typically there will be a plurality of UEs 10 in the cell serviced by the eNB 12, and the eNB's transmissions to these UEs is multiplexed on the various PDCCHs. The UEs 10 may or may not be identically constructed, but in general are all assumed to be electrically and logically compatible with the relevant network protocols and standards needed for operation in the wireless network 1.

Figure 3A:
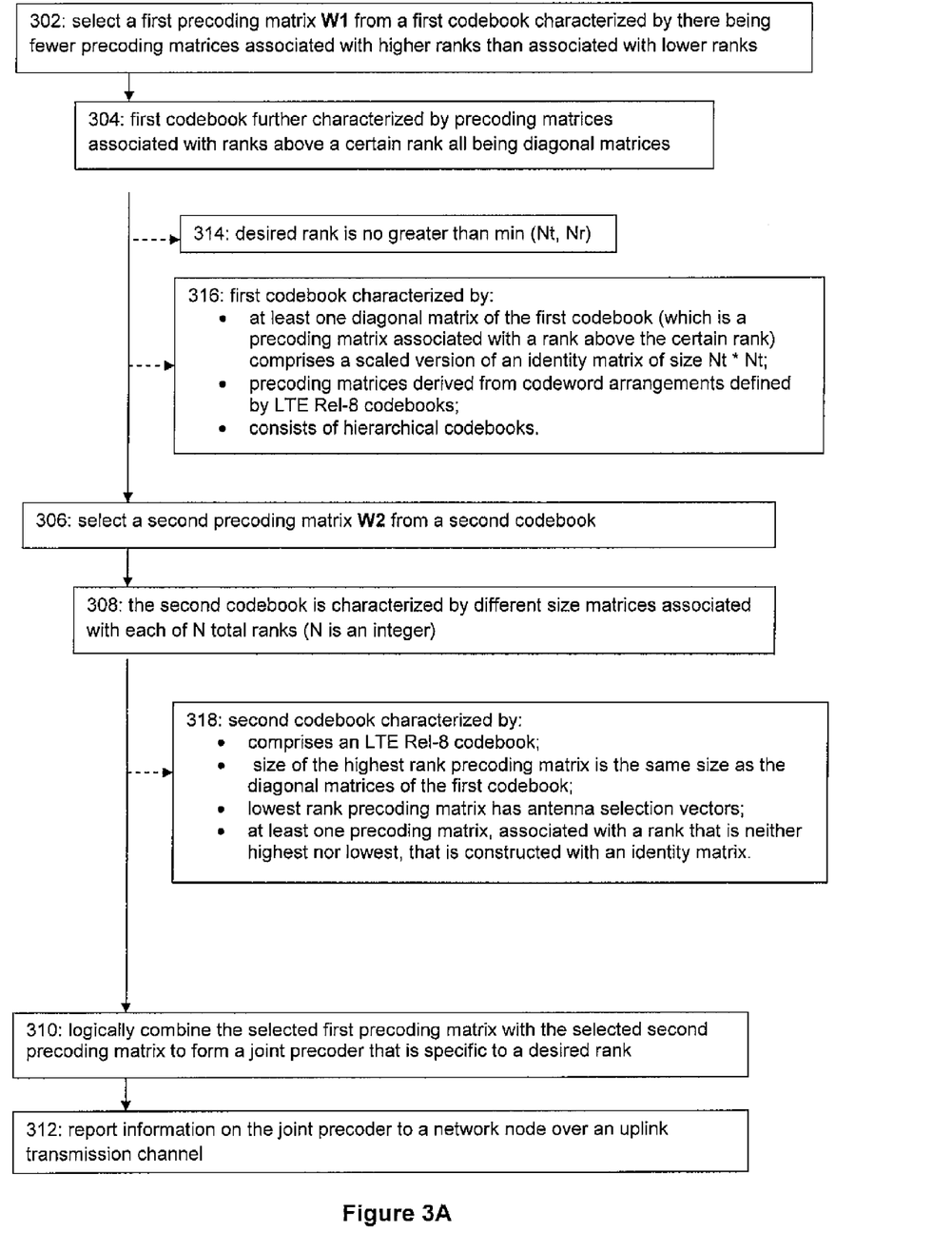
FIGS. 3A-B are logic flow diagrams that each illustrates the operation of a method, and a result of execution of computer program instructions embodied on a computer readable memory, in accordance with the exemplary embodiments of this invention.
Figure 3B:
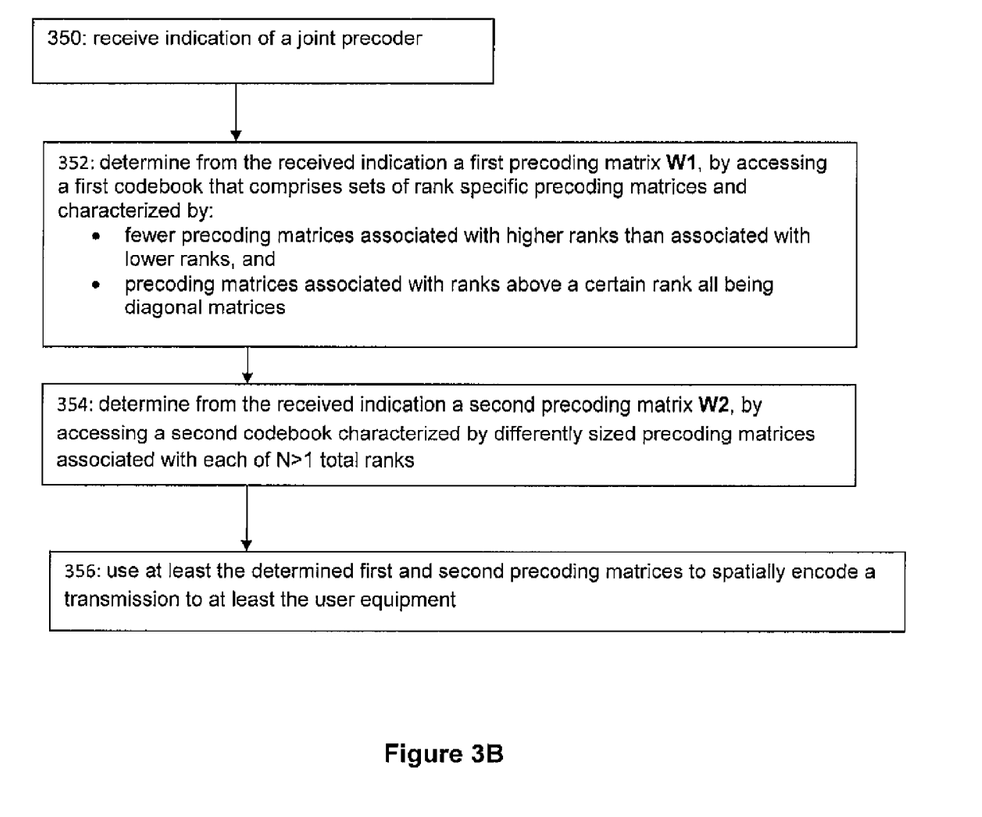

Further details and implementations are described particularly below with reference to FIGS. 3A-B. While both the UE 10 and the eNB 12 may use these teachings for their own precoded transmissions, without loss of generality the below description of FIG. 3A is from the perspective of the UE 10, and for FIG. 3B is from the perspective of the eNB 12. From the perspective of both the UE and the eNB, exemplary embodiments of this invention encompass a method; an apparatus that comprises a processor and memory storing a program and possibly also a transmitter and a receiver; and a memory embodying a computer program; that operate along the lines shown at FIGS. 3A-B.

Specifically at FIG. 3A, at block 302 the UE selects a first precoding matrix W1 from a first codebook (which targets long term channel state information, wideband or for a frequency specific sub-band). Long term is defined relative to the short term channel state information provided by precoding matrix W2, detailed below at block 306. As noted above for each of the examples in the three tables 1-3 above the first codebook is characterized by there being fewer precoding matrices associated with higher ranks than associated with lower ranks. Specifically, in the first codebook there is no rank which has more precoding matrices associated with it than are associated with any lower rank of that same first codebook.

At block 304 it is stipulated that the first codebook is characterized by precoding matrices associated with ranks above a certain rank all being diagonal matrices. This is shown also in each of the three examples in tables 1-3 above; the matrix for all ranks higher than RI=4 have only 8*8 identity matrices which are special cases of diagonal matrices. Each of RI=5 through 8 may have one or more than one such diagonal matrices.

At block 306 there is selected a rank-specific second precoding matrix W2 from a second codebook (which targets short term channel state information and/or frequency selective channel properties but which may alternatively target wideband channel properties). In an exemplary embodiment the second precoding matrix W2 is selected with reference to the selection of the first precoding matrix W1; W2 is selected after W1 on the equivalent channel and constructed from the actual radio channel in combination with W1. At block 308 it is stipulated that the second codebook is characterized by different size precoding matrices being associated with each of N total ranks, in which N is an integer that in the three above examples is equal to eight. Each of the examples in the three tables 1-3 above show one different size preceding matrix for each different rank for that second codebook used to select W2. For example, at table 1 these matrix sizes run 2*1, 2*2, 8*3, 8*4, etc. increasing to 8*8. Both the first codebook of W1 preceding matrices for long term channel state information and the second codebook of W2 preceding matrices for short term/frequency specific channel state information are stored in the local MEM of the UE 10 (and also in the MEM of the eNB 12)

At block 310 the selected first preceding matrix is logically combined with the selected second preceding matrix to form a joint precoder that is specific to a desired rank (which desired rank may or may not be the same as the rank of the individual selected matrices, since those matrices are logically combined). In the specific examples above the two selected preceding matrices are multiplied together, but some other logical combination may be used instead. Then at block 312 information on the joint precoder is reported to a network node over an uplink transmission channel. By example, the network node may be an eNB 12 of a LTE Release 10 system, or a relay node or some other radio access node.

The dashed arrows in FIG. 3 represent optional elements, consistent with certain design criteria detailed above. At block 314 the desired rank that is used to select from the first and second codebooks is no greater than the lesser of number of transmit antennas Nt and number of receive antennas Nr that are involved in sending the transmission at block 312.

Block 316 lists several additional characteristics of the first codebook of W1 for the long term channel state information, characteristics which arise from designing according to the teachings set forth above. These may be individually present in a particular embodiment or multiple such characteristics may be present in an individual embodiment. One characteristic of the first codebook (that carries the W1 matrices) at block 316 is that at least one diagonal matrix of the first codebook (which is a preceding matrix associated with a rank above the certain rank) comprises a scaled version of an identity matrix of size Nt*Nt. Such a diagonal matrix may carry antenna calibration elements.

Another characteristic of the first codebook at block 316 is that it comprises precoding matrices derived from codeword arrangements defined by LTE Rel-8 codebooks; and further the first codebook in an embodiment consists of hierarchical codebooks.

Block 318 lists several additional characteristics of the second codebook for short term channel state information, characteristics which arise from designing according to the teachings set forth above. These also may be individually present in a particular embodiment or multiple such characteristics may be present in an individual embodiment. One characteristic of the second codebook at block 318 is that the second codebook comprises an LTE Rel-8 codebook; and comparing to the W1 matrices in any of the above three examples it is seen that that the size of the precoding matrix of the second codebook that is associated with a highest rank is the same size as the diagonal matrices of the first codebook. Additionally, the precoding matrix of the second codebook associated with the lowest of the N ranks is characterized by having antenna selection vectors. And also as shown for RI=2 for the first example and RI=4 for the second and third examples of tables 1-3, there is at least one matrix of the second codebook that is associated with neither a lowest nor a highest rank (RI=1 and 8 in the examples above) that is constructed with an identity matrix.

The process steps of FIG. 3A may for example be followed by the UE 10 in which the report is sent on its uplink. Note that the various blocks shown in FIG. 3A for a particular entity (UE in particular) may be viewed as method steps, and/or as operations that result from operation of computer program code, and/or as a plurality of coupled logic circuit elements constructed to carry out the associated function(s).

At FIG. 3B is shown an exemplary process from the perspective of an eNB 12. The eNB receives at block 350 from a user equipment an indication of a joint precoder. At block 352 it determines from the received indication a first precoding matrix W1. It does this by accessing a first codebook stored in its memory, and this codebook is the same as that stored at the UE 10. The first codebook comprises sets of rank specific precoding matrices and is characterized by there being fewer precoding matrices associated with higher ranks than associated with lower ranks, and the first codebook is further characterized by precoding matrices associated with ranks above a certain rank all being diagonal matrices.

At block 354 the eNB 12 determines from the received indication a second precoding matrix W2. This it does also by accessing a second codebook stored in the memory, but in this case, like for the UE 10, the second codebook is characterized by differently sized precoding matrices associated with each of N total ranks. N of course is an integer greater than one. The eNB 12 then uses at block 356 at least the determined first and second precoding matrices to spatially encode a transmission to at least the user equipment. The eNB 12 may use joint precoders it receives from multiple UEs to determine its own joint precoder for sending a MU-MIMO message to those multiple UEs.

The process steps of FIG. 3B may for example be followed by the eNB 12 for its own DL transmissions. Note that the various blocks shown in FIG. 3B for a particular entity (eNB in particular but also could be performed by a relay node for example) may be viewed as method steps, and/or as operations that result from operation of computer program code, and/or as a plurality of coupled logic circuit elements constructed to carry out the associated function(s).

In one exemplary embodiment of this invention there is an apparatus comprising at least one processor and at least one memory storing a program of computer readable instructions, in which the at least one processor is configured to operate with the memory and the stored program to cause the apparatus to perform at least the elements set forth at FIG. 3A or 3B. In another exemplary embodiment of this invention there is a memory storing a program of instructions that when executed by a processor result in actions comprising those set forth at FIG. 3A or 3B.

In general, the various exemplary embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. As such, it should be appreciated that at least some aspects of the exemplary embodiments of the inventions may be practiced in various components such as integrated circuit chips and modules.

Various modifications and adaptations may become apparent to those skilled in the relevant arts in view of the foregoing description, when read in conjunction with the accompanying drawings and the appended claims. For example, certain blocks shown in FIGS. 3A-B may be executed in other than the order shown, and certain of the computations described may be performed in other ways. However, all such and similar modifications of the teachings of this invention will still fall within the scope of this invention.

Further, while the exemplary embodiments have been described above in the context of the LTE Release 10 system, it should be appreciated that the exemplary embodiments of this invention are not limited for use with only this one particular type of wireless communication system, and that they may be used to advantage in other types of wireless communication systems which use both long term and short term channel feedback.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements may be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method comprising:
    selecting a first precoding matrix W1 from a first codebook comprising sets of rank specific precoding matrices, the first codebook characterized by there being equal or fewer precoding matrices when the ranks increase, and characterized by precoding matrices associated with ranks above a certain rank all being diagonal matrices;
    using the selected first precoding matrix W1 to select a rank-specific second precoding matrix W2 from a second codebook such that the selected first and second precoding matrices form a joint precoder specific to a desired rank, in which the second codebook comprises differently sized precoding matrices associated with N total ranks, in which N is an integer greater than one; and reporting information on the joint precoder to a network node over an uplink transmission channel.

2. An apparatus comprising:
at least one processor; and
at least one memory storing computer program code configured to, with the at least one processor, cause the apparatus at least to perform:
select a first precoding matrix W1 from a first codebook comprising sets of rank specific precoding matrices, the first codebook characterized by there being equal or fewer precoding matrices when the ranks increase, and characterized by precoding matrices associated with ranks above a certain rank all being diagonal matrices;
use the selected first precoding matrix W1 to select a rank-specific second precoding matrix W2 from a second codebook such that the selected first and second precoding matrices form a joint precoder specific to a desired rank, in which the second codebook comprises differently sized precoding matrices associated with N total ranks, in which N is an integer greater than one; and
report information on the joint precoder to a network node over an uplink transmission channel.

3. The apparatus according to claim 2, wherein the desired rank is no greater than the lesser of number Nt of transmit antennas and number Nr of receive antennas involved in a communication from the network node.

4. The apparatus according to claim 2, wherein at least one diagonal matrix of the first codebook that is a precoding matrix associated with a rank above the certain rank comprises a scaled version of an identity matrix of size Nt*Nt, in which Nt is a number of transmit antennas.

5. The apparatus according to claim 2, wherein the first codebook targets at least one of long term and wideband channel properties, and frequency-specific sub-band.

6. The apparatus according to claim 2, wherein the second codebook targets at least one of short term channel properties and frequency selective channel properties.

7. The apparatus according to claim 2, wherein the second codebook targets wideband channel properties.

8. The apparatus according to claim 2, wherein the first codebook comprises precoding matrices derived from codeword arrangements defined by LTE Rel-8 codebooks, and wherein the second codebook comprises an LTE Rel-8 codebook.

9. The apparatus according to claim 2, wherein the second codebook comprises an LTE Rel-8 codebook, and wherein at least one matrix of the second codebook that is associated with neither a lowest nor a highest rank is characterized by being constructed with an identity matrix.

10. The apparatus according to claim 2, wherein size of the precoding matrix of the second codebook that is associated with a highest rank is the same size as the diagonal matrices of the first codebook.

11. The apparatus according to claim 2, wherein the precoding matrix of the second codebook associated with the lowest of the N ranks is characterized by having antenna selection vectors.

12. The apparatus according to claim 2, wherein the first codebook consists of hierarchical codebooks.

13. The apparatus according to claim 2, wherein the certain rank divides the codebook in half so that there are an equal number of ranks above the certain rank as are below and including the certain rank.

14. The apparatus according to claim 2, wherein the certain rank divides the codebook such that there are a greater number of ranks above the certain rank as are below and including the certain rank.

15. The apparatus according to claim 2, wherein the information on the joint precoder that is reported to the network node comprises separate indications of the selected first precoding matrix W1 and the selected second precoding matrix W2.

16. The apparatus according to claim 2, wherein the information on the joint precoder that is reported to the network node comprises an indication of a logical combination of the selected first precoding matrix W1 combined with the selected second precoding matrix W2.

17. A computer program embodied on a non-transitory computer readable storage medium, the computer program configured to control a processor to perform operations, comprising:
selecting a first precoding matrix W1 from a first codebook comprising sets of rank specific precoding matrices, the first codebook characterized by there being equal or fewer precoding matrices when the ranks increase, and characterized by precoding matrices associated with ranks above a certain rank all being diagonal matrices;
using the selected first precoding matrix W1 to select a rank-specific second precoding matrix W2 from a second codebook such that the selected first and second precoding matrices form a joint precoder specific to a desired rank, in which the second codebook comprises differently sized precoding matrices associated with N total ranks, in which N is an integer greater than one; and
reporting information on the joint precoder to a network node over an uplink transmission channel.

18. A method comprising:
receiving from a user equipment an indication of a joint precoder;
determining from the received indication a first precoding matrix W1 by accessing a first codebook stored in a computer readable memory, the first codebook comprising sets of rank specific precoding matrices and characterized by there being equal or fewer precoding matrices when the ranks increase, and characterized by precoding matrices associated with ranks above a certain rank all being diagonal matrices;
determining from the received indication a second precoding matrix W2 by accessing a second codebook stored in the computer readable memory, the second codebook comprises differently sized precoding matrices associated with N total ranks, in which N is an integer greater than one; and
using at least the determined first and second precoding matrices to spatially encode a transmission to at least the user equipment.

19. An apparatus comprising:
at least one processor; and
at least one memory storing computer program code configured to, with the at least one processor, cause the apparatus at least to perform:
determine, from a received indication of a joint precoder, a first precoding matrix W1 by accessing a first codebook stored in the memory, the first codebook comprising sets of rank specific precoding matrices and characterized by there being equal or fewer precoding matrices when the rank increase, and characterized by precoding matrices associated with ranks above a certain rank all being diagonal matrices;

determine from the received indication a second precoding matrix W2 by accessing a second codebook stored in the memory, the second codebook comprises differently sized precoding matrices associated with N total ranks, in which N is an integer greater than one; and use at least the determined first and second precoding matrices to spatially encode a transmission to at least one user equipment.

20. The apparatus according to claim 19, wherein the apparatus comprises a network node that is one of a base station and a relay node operating in a LTE Release 10 system, and the indication of the joint precoder is received from the at least one user equipment.

* * * * *